United States Patent [19]

Spechko

[11] 4,222,614

[45] Sep. 16, 1980

[54] SURGE CONTROL FOR ELECTRICAL TRAILER BRAKES

[75] Inventor: John A. Spechko, Elkhorn, Wis.

[73] Assignee: Warner Electric Brake & Clutch Co., South Beloit, Ill.

[21] Appl. No.: 13,964

[22] Filed: Feb. 22, 1979

[51] Int. Cl.² .............................................. B60T 13/68
[52] U.S. Cl. .................................... 303/20; 280/446 R
[58] Field of Search ................ 303/20, 3, 7; 188/3 R, 188/112; 280/446 B, 446 R

[56] References Cited

U.S. PATENT DOCUMENTS

| | | | |
|---|---|---|---|
| 2,693,251 | 11/1954 | Hall | 188/3 R |
| 3,907,071 | 9/1975 | Wells | 303/20 X |
| 3,955,652 | 5/1976 | Nilsson et al. | 303/20 X |
| 4,050,550 | 9/1977 | Grossner et al. | 188/3 R X |

Primary Examiner—Trygve M. Blix
Assistant Examiner—Reinhard J. Eisenzopf
Attorney, Agent, or Firm—Leydig, Voit, Osann, Mayer & Holt, Ltd.

[57] ABSTRACT

The electrical brake coils of a trailer are energized when the stoplight switch of the towing vehicle is closed and the trailer surges forwardly with respect to the towing vehicle to cause the wiper of a rheostat to move relatively along the resistor of the rheostat. A hazard switch for causing the stoplights of the towing vehicle to flash is connected in parallel with the stoplight switch in the stoplight circuit of the towing vehicle. The resistor of the rheostat is formed with a normally non-conductive portion which prevents the brake coils from being repetitively pulsed with current when the hazard switch is actuated. Once surge braking has been initiated, however, the non-conductive portion of the resistor is rendered conductive so that current will be supplied continuously to the brake coils over the full range of movement which the trailer undertakes during surge braking.

6 Claims, 3 Drawing Figures

ON TOWING VEHICLE | ON TRAILER

SURGE CONTROL FOR ELECTRICAL TRAILER BRAKES

BACKGROUND OF THE INVENTION

This invention relates to a braking system for automatically applying the brakes of a trailer when the trailer surges forwardly relative to a towing vehicle. More particularly, the invention pertains to an electrical surge braking system for a trailer having wheel brakes which are engaged when associated electrical coils are energized by the battery of the towing vehicle.

Typically, such a brake system includes a rheostat which is connected in a series path with the battery, the brake coils and the stoplight switch of the towing vehicle. The trailer usually is coupled to the towing vehicle by two hitch members which move relative to one another when the trailer tends to overrun and surge forwardly with respect to the towing vehicle during application of the brakes of the towing vehicle. The resistor of the rheostat is carried by one of the hitch members while the wiper of the rheostat is carried by the other hitch member.

When the brakes of the towing vehicle are applied and the trailer surges forwardly, an energizing path between the battery and the brake coils is established through the stoplight switch and the rheostat. As surge occurs, the wiper of the rheostat moves along the resistor and decreases the effective resistance value of the resistor in proportion to the relative displacement of the trailer. In this way, the energizing current to the brake coils is modulated to cause the braking torque to vary as a function of the displacement of the trailer.

The electrical connection between the battery of the towing vehicle and the rheostat of the trailer is established by tapping the stoplight circuit of the towing vehicle. In most modern vehicles made in the United States, the stoplights not only are energized when the brakes of the towing vehicle are applied and the stoplight switch is closed but also are flashed on and off when the hazard switch is actuated and repetitively closes and opens. The stoplight switch and the hazard switch usually are connected in parallel with one another in the stoplight circuit of the towing vehicle. Because that circuit is tapped to establish an electrical connection to the trailer, the rheostat and brake coils of a conventional surge braking system are repetitively pulsed with current whenever the hazard switch is actuated and the stoplight switch is open. In a conventional system, therefore, the trailer brakes will be repeatedly applied and released when the hazard switch is actuated even though there is no surge and no braking is required.

It has been proposed to eliminate the repetitive pulsing effected by the hazard switch by building a so-called "deadband" into the rheostat. For example, the portion of the resistor normally contacted by the wiper in the absence of surging may be insulated or made non-conductive so that, even if the hazard switch is closed, current will not be conducted to the brake coils by way of the rheostat until such time as surge occurs and the wiper moves off of the deadband or non-conductive portion of the resistor and onto the conductive portion thereof.

While the provision of a deadband in the rheostat overcomes the problem of repetitive braking caused by actuation of the hazard switch, the deadband introduces another problem. That is, once surge braking has been initiated, some trailers inherently tend to oscillate back and forth relative to the towing vehicle. During such oscillation, the wiper may repeatedly move onto and off of the deadband and may cause "on and off" braking of the trailer rather than smooth, continuous braking of the type which is effected when the brake coils are constantly energized. The on and off braking action sometimes accentuates oscillation of the trailer.

SUMMARY OF THE INVENTION

The general aim of the present invention is to provide a new and improved surge braking system in which the brake coils remain de-energized when the hazard switch is actuated but are continuously energized during surge braking even though the trailer oscillates back and forth behind the towing vehicle.

A related object is to provide a surge brake control which is non-responsive to actuation of the hazard switch while being fully responsive to surging of the trailer over the entire range of relative displacement of the trailer.

A more detailed object is to provide a surge brake control having a rheostat whose resistor includes a portion which normally is a deadband to prevent energization of the brake coils when the hazard switch is actuated but which is made an active part of the resistor when needed to effect continuous energization of the coils and provide smooth braking of the trailer.

The invention also resides in the comparatively simple and inexpensive manner in which the deadband portion of the resistor is switched back and forth between a deadband and a non-deadband state.

These and other objects and advantages of the invention will become more apparent from the following detailed description when taken in conjunction with the accompanying drawings.

DETAILED DESCRIPTION OF THE PREFERRED EMBODIMENT

Figure 1:
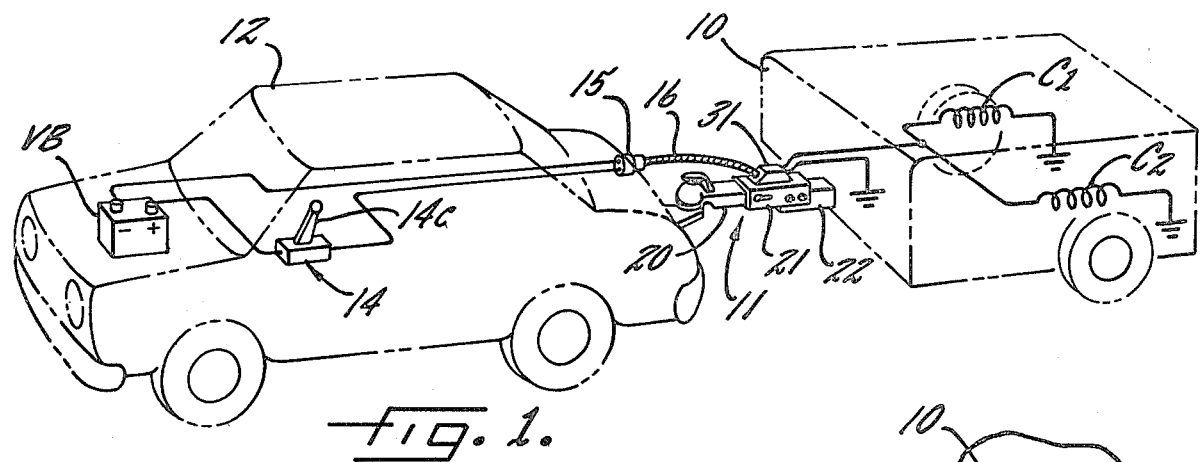
FIG. 1 is a diagrammatic perspective illustration of a trailer equipped with electrically actuatable brakes and removably hitched to a towing vehicle.

Referring to the diagrammatic perspective of FIG. 1 a trailer 10 is shown coupled by a removable hitch 11 to a towing vehicle 12. The latter may be an automobile, truck or tractor and will here be referred to as simply the vehicle. In well known and conventional fashion, the towing vehicle carries a voltage source, here a 12-volt battery VB, connected into its electrical system, and also a hand or foot controller 14 comprising a resistor 14a (FIG. 3) along which a wiper 14b is slidable by the setting of a control lever 14c.

When the hitch 11 is hooked up, the user joins the plug and socket parts of a disengageable, multi-terminal electrical connector 15 at the rear of the towing vehicle 12, so that connections are established via a cable 16 for controllable energization of brake coils C1 and C2 on the trailer 10, as well as connections for the trailer lights and other electrical components. The connector 15 is here shown in its most simple form as having three pairs of mating disengageable terminals 15a, 15b and 15c (FIG. 3) connected to the coils by lines $L_1$, $L_2$ and $L_3$ which lead from the cable 16.

Because the details of the brake construction are well known and per se form no part of the invention, it will suffice to note that the wheels of the trailer 10 are equipped with brakes, preferably of the electromagnetic type, respectively associated with the coils $C_1$ and $C_2$. When energized or excited by electric current, these coils cause the wheel brakes to be actuated or engaged to produce braking torque which is preferably proportional to the magnitude of the exciting current. The coils $C_1$ and $C_2$ may be conveniently considered to be a single coil C inasmuch as the two coils are normally connected in parallel and, in any event, the invention to be described can be applied to a single brake having a single coil or to several brakes controlled either by only one coil or by several coils.

Figure 3:
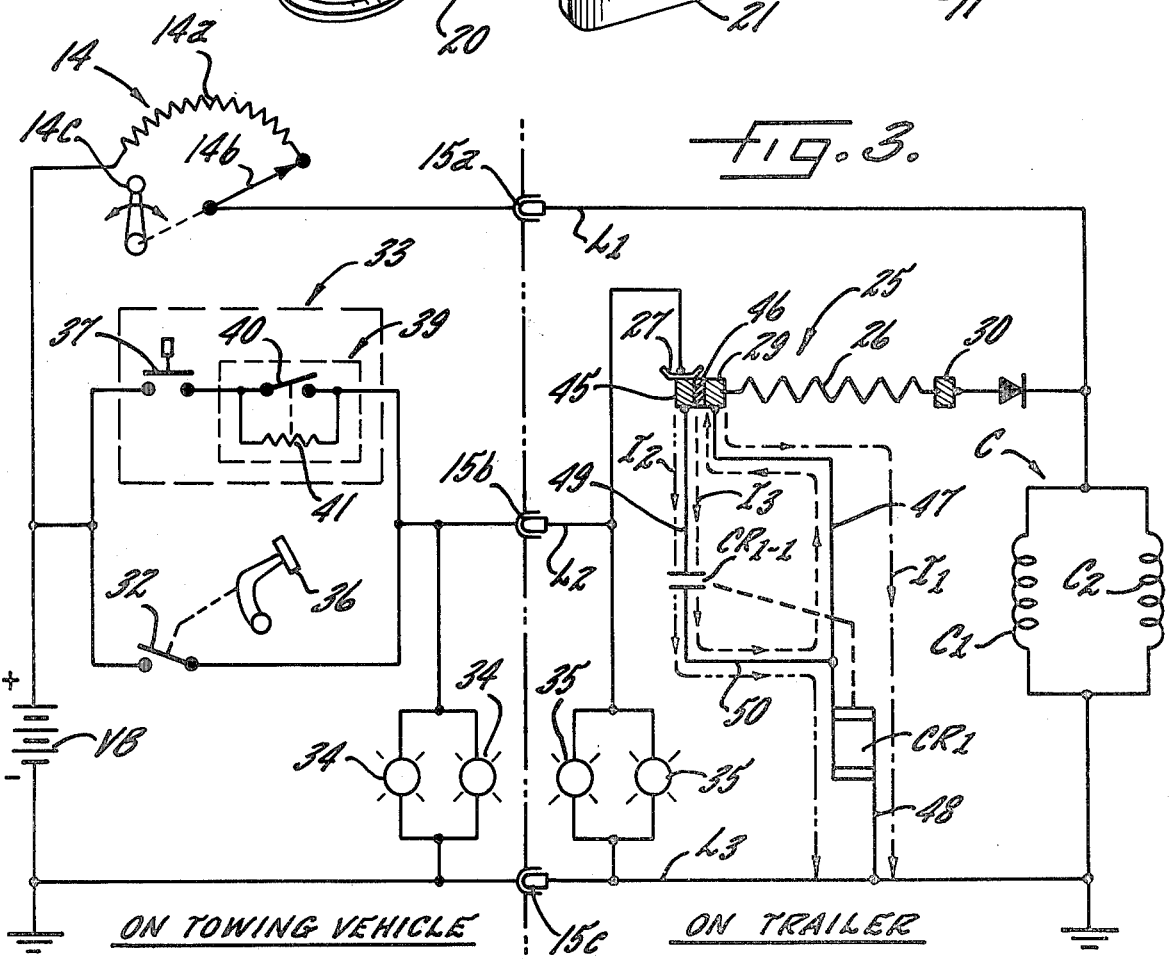
FIG. 3 is a schematic circuit diagram of the braking system.

The coil C is adapted to be variably energized by current flow through the connector 15 and the cable 16 according to the vehicle driver's setting of the lever 14c. The resistor 14a for variably energizing the trailer brake coil C under normal driving conditions is shown in FIG. 3 as having one end connected to the positive terminal of the battery VB and as having the wiper 14b connected through the terminals 15a directly to the coil C by the line $L_1$ and thence to the negative terminal of the battery by the line $L_3$ and the terminals 15c. While the modulated or variable energization of the brake coil C forms no part of the present invention, it will be understood that by movement of the lever 14c and the wiper 14b, the driver of the towing vehicle may under ordinary circumstances controllably apply the trailer brakes by varying the energizing current through the coil C.

Figure 2:
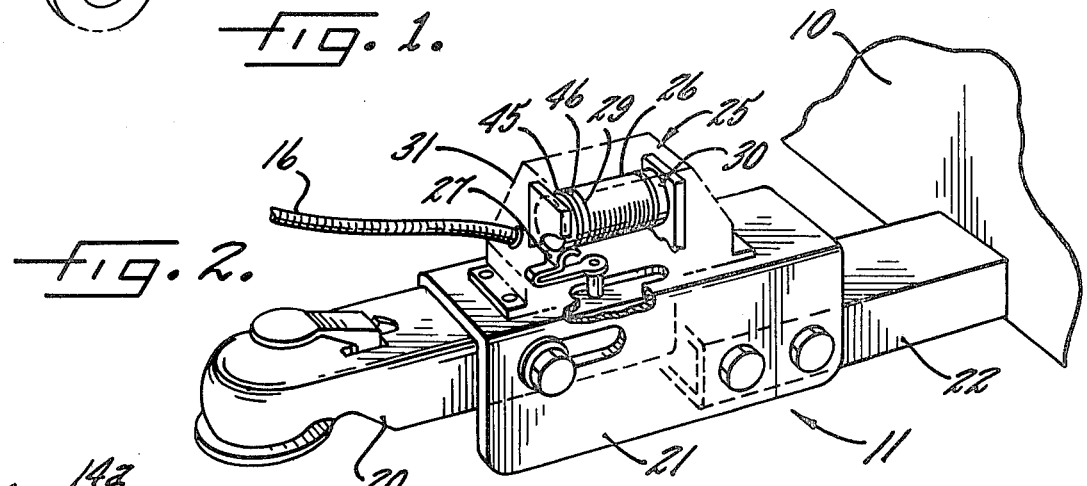
FIG. 2 is a perspective view of the trailer hitch and of the new and improved surge brake control which incorporates the unique features of the present invention.

In the present instance, the brake coil C is also adapted to be automatically and variably energized when the brakes of the towing vehicle 12 are applied and the trailer 10 tends to overrun or surge forwardly relative to the towing vehicle. To permit the trailer to move forwardly with respect to the towing vehicle, the hitch 11 is formed by two relatively movable hitch members 20 and 21 (FIG. 2.). The forward hitch member 20 is coupled to the hitch ball on the towing vehicle while the rear hitch member 21 is coupled rigidly to the tongue 22 of the trailer and is mounted to slide forwardly and rearwardly along the forward hitch member. A coil spring and a shock absorber (not shown) act between the two hitch members to urge the trailer in a rearward direction and to cushion the trailer and dampen oscillation when the trailer surges forwardly.

To automatically energize the brake coil C during forward surging of the trailer 10, first means are provided for responding to relative movement of the hitch members 20 and 21 and for supplying the coil with exciting current whose magnitude varies as a function of the forward displacement of the trailer. While such first means may take various forms, there preferably is employed a rheostat 25 having a resistor 26 mounted on one of the hitch members and having a wiper 27 mounted on the other hitch member and movable relatively along the resistor to vary the effective resistance value thereof. In this particular instance, the resistor 26 is carried on the rear hitch member 21 and, when the trailer surges forwardly, the resistor moves forwardly across the wiper 27, the latter being mounted on the forward hitch member 20. It should be realized, however, that the resistor 26 and the wiper 27 could be mounted on the forward and rear hitch members 20 and 21, respectively, and that the wiper could move physically along the resistor.

The resistor 26 of the rheostat 25 may be of any suitable construction and may consist of several turns of conductive wire wound around a non-conductive core. In FIG. 3, conductive rings 29 and 30 are shown as being located at the forward and rear ends, respectively, of the wire but it should be appreciated that these rings form part of the overall resistor. The resistor is covered by a suitable housing 31 (FIG. 2) on the upper side of the rear hitch member 21.

As shown in FIG. 3, the rheostat 25 is connected by the terminals 15b and 15c in a series path which includes the battery VB and the brake coil C and which further includes a parallel combination of switching devices 32 and 33 carried by the towing vehicle 12. The switching device 32 constitutes the stoplight switch of the towing vehicle. Whenever this switch is closed, the stop or brake lights 34 of the towing vehicle are energized from the battery and, in addition, the stoplights 35 of the trailer 10 are energized via the terminals 15b and 15c. The stoplight switch 32 is shown as being actuated directly by the brake pedal 36 of the towing vehicle so as to be closed and opened whenever the pedal is depressed and released, respectively. The stoplight switch, however, could be responsive to the pressure of the hydraulic brake system of the towing vehicle.

The switching device 33 constitutes the harzard light switch of the towing vehicle 12 and, when actuated, causes the stoplights 34 and 35 to turn on and off on a repetitive basis to serve as a warning to other vehicles. Herein, the switching device is shown as including a manually actuatable switch 37 (usually mounted near the steering column) adapted to be pushed closed to activate the hazard lights (i.e., to flash the stoplights) and adapted to be pulled open to inactivate those lights. Connected in series with the manual switch 37 is a flasher 39 which causes the stoplights to repeatedly turn on and off whenever the switch 37 is closed. Various types of flashers are used in different vehicles. The flasher which has been shown includes a thermally responsive or snap-action bimetallic switch 40 in series with the switch 37 and adapted to close and open when heated and cooled, respectively. A high resistance heater 41 is connected across the switch 40 and is heated by current flow from the battery VB when the switch 37 is initially closed. The heat causes closure of the switch 40 to turn on the hazard lights 34 and 35. When the switch 40 closes, it shunts current from the heater, causing the latter to cool so that the switch 40 opens to turn off the hazard lights. The heater then is re-heated and effects re-closure of the switch 40.

Thus, the stoplight switch 32 constitutes a switching device which is rendered conductive and non-conductive when the brakes of the towing vehicle 12 are applied and released, respectively. The manual switch 37 and the flasher 39 form a switching device 33 which may be selectively actuated independently of application and release of the brakes of the towing vehicle and which, when actuated, repetitively switches between a conductive state and a non-conductive state.

As pointed out above, the rheostat 25 is connected in a series path with the battery VB, the parallel combination of switches 32 and 33 and the coil C. Whenever the brakes of the towing vehicle 12 are applied, the stoplight switch 32 closes and the trailer 10 normally will surge forwardly to move the resistor 26 of the rheostat forwardly past the wiper 27. Thus, current will be conducted to the brake coil via the stoplight switch and the rheostat. As the resistor moves progressively forward, its effective resistance value is progressively reduced and hence the magnitude of the current supplied to the coil is progressively increased. In this way, the coil is excited in proportion to the degree of surge and thus higher and lower braking torques will be developed when the trailer surges forwardly by greater and lesser amounts, respectively.

Although the spotlight switch 32 and the hazard switch 33 are physically located in different positions in the towing vehicle 12, these switches are—in many vehicles and as shown in FIG. 3—connected in parallel in the energizing circuit of the stoplights 34. When that circuit is tapped, for example, at the terminals 15b and 15c of the connector 15 to establish an energizing path for the coil C via the stoplight switch 32 and the rheostat 25, current may flow to the wiper 27 of the rheostat by way of the harazd switch 33 as well as by way of the spotlight switch. Accordingly, if the hazard switch 33 is actuated and if the wiper 27 is in conductive contact with the resistor 26, the brake coil C will be repetitively pulsed with current as the flasher switch 40 closes and opens even if the stoplight switch 32 is open and even if the trailer has not surged forwardly. In other words, there is a possibility that the coil could be repeatedly energized and de-energized and effect on and off braking if the towing vehicle is traveling in a normal manner (i.e., not being braked) but with the hazard switch actuated.

To avoid repetitive pulsing of the coil C by current conducted by way of the hazard switch 33, it has been proposed to construct the rheostat 25 such that the wiper 27 is disposed out of conductive contact with the resistor 26 when the trailer 10 is being towed normally and is not surging forwardly. This proposal solves the problem posed by the hazard switch but introduces still another problem. That is, the trailer tends to pull rearwardly after the trailer brakes have been applied following a forward surge. Rearward movement of the trailer decreases the braking action (as a result of the wiper 27 increasing the effective resistance of the resistor 26) and thus the trailer again tends to surge forwardly to increase the braking action.

Accordingly, the trailer 10 may oscillate back and forth as the braking action occurs. If the wiper 27 were allowed to move out of conductive contact with the resistor 26 when the trailer pulls to its extreme rear position (i.e., the same position that prevails in the absence of surge), all current flow to the brake coil C would be momentarily cut off. To promote smooth braking, it is desirable to supply current continuously to the coil once surge braking has been initiated. It is undesirable to completely interrupt the current as the trailer reaches its far rear position if the brakes of the towing vehicle 12 are still being applied.

In accordance with the present invention, the surge brake control means (e.g., the rheostat 25) is uniquely arranged so as to be non-responsive to actuation of the hazard switch 33 but to be fully responsive to movement of the trailer 10 over the full range of back and forth movement which occurs during surge braking. As a result, actuation of the hazard switch is not effective to cause repetitive pulsing of the brake coil C and yet, at the same time, current is continuously applied to the coil once surge braking has been initiated and until such braking is no longer required.

In carrying out the invention, the first means or rheostat 25 includes a conductor 45 (FIG. 3) which is located adjacent to the forward end of the resistor 26 but which is insulated electrically from the resistor. Herein, the conductor 45 is shown as being a conductive ring spaced fowardly from the forward ring 29 of the resistor and separated from the ring 29 by a ring 46 of insulating material. The rings 45 and 46 may be supported on and secured to the core of the resistor and thus the rings move with the resistor when the trailer 10 surges.

As shown in FIG. 3, the width of the insulating ring 46 is less than the width of the wiper 27 of the rheostat 25. As a result, the wiper is capable of momentarily spanning the two conductive rings 45 and 46 and establishing a conductive bridge across those rings when the resistor first moves forwardly during initial surging of the trailer 10.

When the trailer 10 is in its normal rear position and no surge braking is required, the wiper 27 is disposed in conductive contact with the ring 45 and is disposed out of conductive contact with the ring 29 by virtue of the resistor 27 being in its far rear position as shown in FIG. 3. Thus, if the hazard switch 33 is actuated, current cannot be conducted to the brake coil C via the resistor since the wiper is insulated from the resistor. Under these conditions, the ring 45 forms a non-conductive deadband at the forward end of the resistor and prevents the coil C from being repetitively pulsed with current when the hazard switch 33 is actuated.

When the brakes of the towing vehicle 12 are first applied and the stoplight switch 32 is first closed, current still is not conducted to the brake coil C since the wiper 27 is disposed in contact with the deadband ring 45 and is disposed out of conductive contact with the ring 29 and the resistor 26. But, when the trailer 10 initially surges forwardly, the wiper first bridges the rings 45 and 29 and then moves relatively along the resistor 26 to supply current to the coil and effect application of the trailer brakes.

Importantly, second means or control means are provided for causing the deadband ring 45 to become an active, conductive part of the resistor 26 when the trailer 10 first surges forwardly and for causing the ring 45 to maintain that status until the stoplight switch is subsequently opened and surge braking is no longer required. Herein, the second means or control means comprise a relay coil CR1 which is connected across the line L3 and the forward end or ring 29 of the resistor by lines 47 and 48 so that the relay coil becomes energized by current flow along a path $I_1$ whenever the stoplight switch 32 is closed and the wiper 27 is in contact with the ring 29 or the resistor 26. Relay contacts CR1-1 which form a controllable switching device are connected across the rings 45 and 29 by lines 49 and 50 and the line 47 and are closed whenever the relay coil is energized. The relay contacts also are connected in a series path $I_2$ with the ring 49 and the relay coil CR1 by the lines 49, 50 and 47.

When the stoplight switch 32 is closed and the trailer 10 surges forwardly, the brake coil C is energized and, in addition, the relay coil CR1 is energized by current flow along the path $I_1$ by virtue of the wiper 27 contacting first the ring 29 and then the resistor 26. Energization of the relay coil effects closure of the relay contacts CR1-1 preparatory to the trailer moving rearwardly relative to the towing vehicle 12 as the trailer brakes are applied. If the trailer moves rearwardly sufficiently far to cause the wiper to re-bridge the rings 29 and 45, current flows to the relay coil along the path $I_2$ (i.e., via the wiper, the ring 45, the line 49, the relay contacts CR1-1 and the line 50) to seal in the relay coil through the contacts before the ring 29 moves rearwardly out of contact with the wiper and interrupts current flow to the relay coil along the path $I_1$. Upon continued rearward movement of the trailer, the ring 29 will move out of conductive contact with the wiper 27 but the relay coil will be sealed in and will remain energized by virtue of current flow along the path $I_2$ and through the closed relay contacts. As a result, the relay contacts remain closed.

With the relay contacts CR1-1 closed and with the wiper 27 disposed in contact with the ring 45, current may flow to the resistor 26 along a path $I_3$. That is to say, current may flow to the resistor 26 via the wiper 27, the ring 45, the line 49, the relay contacts CR1-1, the lines 50 and 47 and the ring 29 to keep the brake coil C energized even though the trailer 10 is disposed in its far rear position and the wiper is contacting only the ring 45. Accordingly, the brake coil is not completely de-energized when the trailer reaches its far rear position following surge braking but instead is supplied with current by way of the ring 45, which has been enabled and made an active part of the resistor 26 as a result of the closed relay contacts. Thus the brake coil remains continuously energized and is not pulsed on and off.

When the brakes of the towing vehicle 12 are released and the stoplight switch 32 is opened, current flow to the wiper 27 is interrupted and thus the relay coil CR1 is de-energized and the contacts CR1-1 are opened. The ring 45 then once again is disabled and again becomes a non-conductive deadband (i.e., an inactive portion of the resistor 26) so that the brake coil C cannot be energized if the hazard switch 33 is actuated.

To summarize, the wiper 27 contacts the ring 45 when surge braking is not being effected and the trailer 10 is in its far rear position. Under these conditions, the relay contacts CR1-1 are open and thus disable the ring 45 so that current cannot be conducted to the brake coil C by way of the ring and the resistor 26. Accordingly, the brake coil will not be repetitively pulsed with current when the hazard switch 33 is closed.

When the spotlight switch 32 is closed, the relay coil CR1 is energized and the relay contacts CR1-1 are closed as soon as the trailer 10 initially surges forwardly. When the trailer pulls to its far rear position, the relay coil is sealed in through the closed relay contacts and thus the contacts remain closed to allow current to be conducted to the coil along the path $I_3$ even though the wiper subsequently contacts only the ring 45. Thus, once surge braking is initiated, the relay contacts enable the ring 45 or take the ring out of its deadband status so that the brake coil C will be supplied continuously with current until the stoplight switch 32 is opened and surge braking is no longer required.

I claim:

1. An electrical surge braking system for use with a trailer adapted to be connected to a towing vehicle and having a brake which is engaged when an associated coil is energized by a battery carried by the towing vehicle, the vehicles being connected by a first hitch member coupled to the towing vehicle and by a second hitch member coupled to the trailer and movable forwardly relative to the first hitch member when the trailer surges forwardly relative to the towing vehicle, a rheostat comprising an electrical resistor carried by one of said hitch members, said rheostat further comprising an electrical wiper carried by the other of said hitch members and movable relatively along said resistor to decrease the effective resistance value of said resistor when said trailer surges forwardly, a parallel combination of normally non-conductive first and second switching devices, said first switching device being rendered conductive and non-conductive when the brakes of the towing vehicle are applied and released, respectively, said second switching device being selectively actuatable independently of application and release of the brakes of the towing vehicle and, when actuated, repetitively switching between a conductive state and a non-conductive state, and means connecting said battery, said parallel combination of switching devices, said rheostat and said coil in a series path, the improvement in said braking system comprising, a conductor carried by said one hitch member and located adjacent to but insulated electrically from said resistor, said wiper contacting said conductor and being disposed out of conductive contact with said resistor in the absence of surging of said trailer, said wiper conductively bridging said conductor and said resistor during initial surging of said trailer, a controllable switching device connecting said conductor and said resistor in series, the control means for:

(i) rendering said controllable switching device non-conductive when said first switching device is non-conductive and said wiper is in contact with said conductor and is disposed out of conductive contact with said resistor, (ii) rendering said controllable switching device conductive when said first switching device is conductive and said wiper conductively bridges said conductor and said resistor, and (iii) keeping said controllable switching device conductive until said first switching device is subsequently rendered non-conductive.

2. A system as defined in claim 1 in which said controllable switching device and said control means constitute the contacts and the control coil, respectively, of a relay, said control coil being connected in a first series path which includes said wiper and said resistor and being connected in a second series path which includes said wiper, said conductor and said contacts.

3. A system as defined in claim 2 in which said contacts are connected in a third series path which includes said wiper, said conductor and said resistor.

4. An electrical surge braking system for use with a trailer adapted to be connected to a towing vehicle and having a brake which is engaged when an associated coil is energized by a battery carried by the towing vehicle, the vehicles being connected by a first hitch member coupled to the towing vehicle and by a second hitch member coupled to the trailer and movable forwardly relative to the first hitch member when the trailer surges forwardly relative to the towing vehicle, a parallel combination of a stoplight switch and a flasher switch, said stoplight switch closing and opening when the brakes of said towing vehicle are applied and released, respectively, said flasher switch being selectively actuatable independently of application and release of the brakes of the towing vehicle and, when actuated, repetitively closing and opening, said parallel combination of switches being connected in a series path with said battery and said coil, the improvement in said braking system comprising, first means connected in said series path between said parallel combination of switches and said coil, said first means being disabled and preventing energization of said coil when either of said switches is in a closed state and said trailer has not surged forwardly, and second means for enabling said first means to permit said coil to be energized by way of said first means after said stoplight switch has been closed and said trailer has surged forwardly and for thereafter keeping said first means enabled until said stoplight switch is subsequently opened even though said trailer is not surging forwardly.

5. An electrical surge braking system for use with a trailer adapted to be connected to a towing vehicle and having a brake which is engaged when an associated coil is energized by a battery carried by the towing vehicle, the vehicles being connected by a first hitch member coupled to the towing vehicle and by a second hitch member coupled to the trailer and movable forwardly relative to the first hitch member when the trailer surges forwardly relative to the towing vehicle, a parallel combination of a stoplight switch and a flasher switch, said stoplight switch closing and opening when the brakes of said towing vehicle are applied and released, respectively, said flasher switch being selectively actuatable independently of application and release of the brakes of the towing vehicle and, when actuated, repetitively closing and opening, said parallel combination of switches being connected in a series path with said battery and said coil, the improvement in said braking system comprising, first means carried by said hitch members and connected in said series path for causing said coil to be energized by said battery whenever said trailer surges forwardly and said stoplight switch is closed and for thereafter keeping said coil energized until said stoplight switch is opened, and second means for disabling said first means and preventing energization of said coil whenever either of said switches is switched from an open state to a closed state prior to surge occurring and for keeping said first means disabled until surge occurs.

6. An electrical surge braking system for use with a trailer adapted to be connected to a towing vehicle and having a brake which is engaged when an associated coil is energized by a battery carried by the towing vehicle, the vehicles being connected by a first hitch member coupled to the towing vehicle and by a second hitch member coupled to the trailer and movable forwardly relative to the first hitch member when the trailer surges forwardly relative to the towing vehicle, and a switching device connected in a series path with said battery and said coil and rendered conductive and non-conductive when the brakes of the towing vehicle are applied and released, respectively, the improvement in said braking system comprising, first means connected in said series path for energizing said coil whenever said trailer surges forwardly and said switching device is conductive and for thereafter keeping said coil energized until said switching device is subsequently rendered non-conductive even though the trailer is not surging forwardly, and second means for disabling said first means and preventing energization of said coil when said switching device is rendered conductive prior to surge occurring and for keeping said first means disabled until surge occurs.

* * * * *